United States Patent
Jethwa et al.

(10) Patent No.: US 12,445,682 B2
(45) Date of Patent: *Oct. 14, 2025

(54) METHOD AND SYSTEM FOR GENERATING A VISUAL COMPOSITION OF USER REACTIONS IN A SHARED CONTENT VIEWING SESSION

(71) Applicant: Roku, Inc., San Jose, CA (US)

(72) Inventors: Ronica Jethwa, Mountain View, CA (US); Sunil Ramesh, Cupertino, CA (US); Michael Cutter, Golden, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,135

(22) Filed: Feb. 6, 2024

(65) Prior Publication Data
US 2024/0251127 A1 Jul. 25, 2024

Related U.S. Application Data

(63) Continuation of application No. 18/158,546, filed on Jan. 24, 2023, now Pat. No. 11,936,948.

(51) Int. Cl.
*H04N 21/442* (2011.01)
*G06V 10/764* (2022.01)
(Continued)

(52) U.S. Cl.
CPC ..... *H04N 21/44218* (2013.01); *G06V 10/764* (2022.01); *G06V 40/176* (2022.01);
(Continued)

(58) Field of Classification Search
None
See application file for complete search history.

(56) References Cited

U.S. PATENT DOCUMENTS

| 11,451,885 B1 | 9/2022 | Chandrashekar |
| 11,936,948 B1 * | 3/2024 | Jethwa ............ H04N 21/44218 |

(Continued)

OTHER PUBLICATIONS

Hannan, "TensorFlow's New Model MoveNet Explained", (Jul. 22, 2021) https://medium.com/@samhannan47/tensorflows-new-model-movenet-explained-3bdf80a8f073, retrieved Apr. 27, 2023*.

(Continued)

*Primary Examiner* — Alexander Q Huerta
(74) *Attorney, Agent, or Firm* — McDonnell Boehnen Hulbert & Berghoff LLP

(57) ABSTRACT

In one aspect, an example method in connection with a shared content viewing session in which multiple users are receiving and viewing respective instances of the same media content in a synchronized manner is disclosed. The example method includes (i) detecting that each of the multiple users respectively exhibits a threshold extent of physical reaction around the same time; (ii) responsive to the detecting, for each of the multiple users, generating and/or storing respective visual content representing that user's physical reaction; (iii) generating a visual content composition that includes at least the generated and/or stored visual content for each of the multiple users; and (iv) outputting for presentation, the generated visual content composition.

20 Claims, 5 Drawing Sheets

(51) Int. Cl.
*G06V 40/16* (2022.01)
*G06V 40/20* (2022.01)
*H04N 21/81* (2011.01)
*H04N 21/854* (2011.01)

(52) U.S. Cl.
CPC ......... *G06V 40/23* (2022.01); *H04N 21/8146* (2013.01); *H04N 21/854* (2013.01)

(56) References Cited

U.S. PATENT DOCUMENTS

| | | | | |
|---|---|---|---|---|
| 2005/0289627 A1* | 12/2005 | Lohman | ............. | H04N 21/4316 348/E7.071 |
| 2012/0185887 A1* | 7/2012 | Newell | .................... | H04N 5/77 725/12 |
| 2012/0296972 A1 | 11/2012 | Backer | | |
| 2013/0283162 A1* | 10/2013 | Aronsson | ............. | G11B 27/105 715/719 |
| 2014/0172848 A1* | 6/2014 | Koukoumidis | ......... | G06F 16/78 707/736 |
| 2016/0098169 A1* | 4/2016 | Herdy | ................ | H04N 21/4223 715/719 |
| 2016/0366203 A1* | 12/2016 | Blong | ................... | H04L 65/612 |
| 2017/0099519 A1* | 4/2017 | Dang | ................. | H04N 21/4223 |
| 2017/0134803 A1* | 5/2017 | Shaw | ................ | H04N 21/234363 |
| 2019/0329134 A1 | 10/2019 | Shriram | | |
| 2021/0037295 A1 | 2/2021 | Strickland | | |
| 2022/0038774 A1* | 2/2022 | Paz | ...................... | H04N 21/632 |
| 2022/0132214 A1 | 4/2022 | Felman | | |
| 2022/0201250 A1* | 6/2022 | Schoenborn | ........... | H04R 1/403 |
| 2022/0224966 A1* | 7/2022 | Smith | ................ | H04N 21/4858 |
| 2022/0385701 A1* | 12/2022 | Wang | ................... | H04L 67/104 |

OTHER PUBLICATIONS

Bazarevsky et al., "BlazePose: On-device Real-time Body Pose tracking", arXiv:2006:10204v1 [cs.CV] Jun. 17, 2020*.

* cited by examiner

METHOD AND SYSTEM FOR GENERATING A VISUAL COMPOSITION OF USER REACTIONS IN A SHARED CONTENT VIEWING SESSION

RELATED DISCLOSURE

This disclosure is a continuation of, and claims priority to, U.S. patent application Ser. No. 18/158,546 filed Jan. 24, 2023, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method in connection with a shared content viewing session in which multiple users are receiving and viewing respective instances of the same media content in a synchronized manner is disclosed. The example method includes (i) detecting that each of the multiple users respectively exhibits a threshold extent of physical reaction around the same time; (ii) responsive to the detecting, for each of the multiple users, generating and/or storing respective visual content representing that user's physical reaction; (iii) generating a visual content composition that includes at least the generated and/or stored visual content for each of the multiple users; and (iv) outputting for presentation, the generated visual content composition.

In another aspect, an example computing system is disclosed. The computing system is configured for performing a set of acts in connection with a shared content viewing session in which multiple users are receiving and viewing respective instances of the same media content in a synchronized manner. The set of acts includes (i) detecting that each of the multiple users respectively exhibits a threshold extent of physical reaction around the same time; (ii) responsive to the detecting, for each of the multiple users, generating and/or storing respective visual content representing that user's physical reaction; (iii) generating a visual content composition that includes at least the generated and/or stored visual content for each of the multiple users; and (iv) outputting for presentation, the generated visual content composition.

In another aspect, an example non-transitory computer-readable medium is disclosed. The computer-readable medium has stored thereon program instructions that upon execution by a computing system, cause performance of a set of acts in connection with a shared content viewing session in which multiple users are receiving and viewing respective instances of the same media content in a synchronized manner. The set of acts includes (i) detecting that each of the multiple users respectively exhibits a threshold extent of physical reaction around the same time; (ii) responsive to the detecting, for each of the multiple users, generating and/or storing respective visual content representing that user's physical reaction; (iii) generating a visual content composition that includes at least the generated and/or stored visual content for each of the multiple users; and (iv) outputting for presentation, the generated visual content composition.

DETAILED DESCRIPTION

I. Overview

A shared content viewing session is a communication session in which multiple users are receiving and viewing respective instances of the same media content in a synchronized manner. Colloquially, such sessions are sometimes referred to as "watch parties." As an example, multiple users in different locations can access a movie via a software application on their respective smart televisions and set up a watch party in which they all watch the movie together. Because the receiving and viewing of the media content occurs in a synchronized manner, playback control of the media content in a shared content viewing session is synchronized as well and can affect playback of the media content across all user devices. For example, if the host of the watch party pauses the movie, the movie will be paused on other user devices as well.

Disclosed herein is a system and method for use in connection with a shared content viewing session. In one aspect, this can involve a computing system (i) detecting that each of the multiple users respectively exhibits a threshold extent of physical reaction around the same time; (ii) responsive to the detecting, for each of the multiple users, generating and/or storing respective visual content representing that user's physical reaction; (iii) generating a visual content composition that includes at least the generated and/or stored visual content for each of the multiple users; and (iv) outputting for presentation, the generated visual content composition. These and related operations will now be described in greater detail.

II. Example Architecture

A. Communication System

Figure 1:
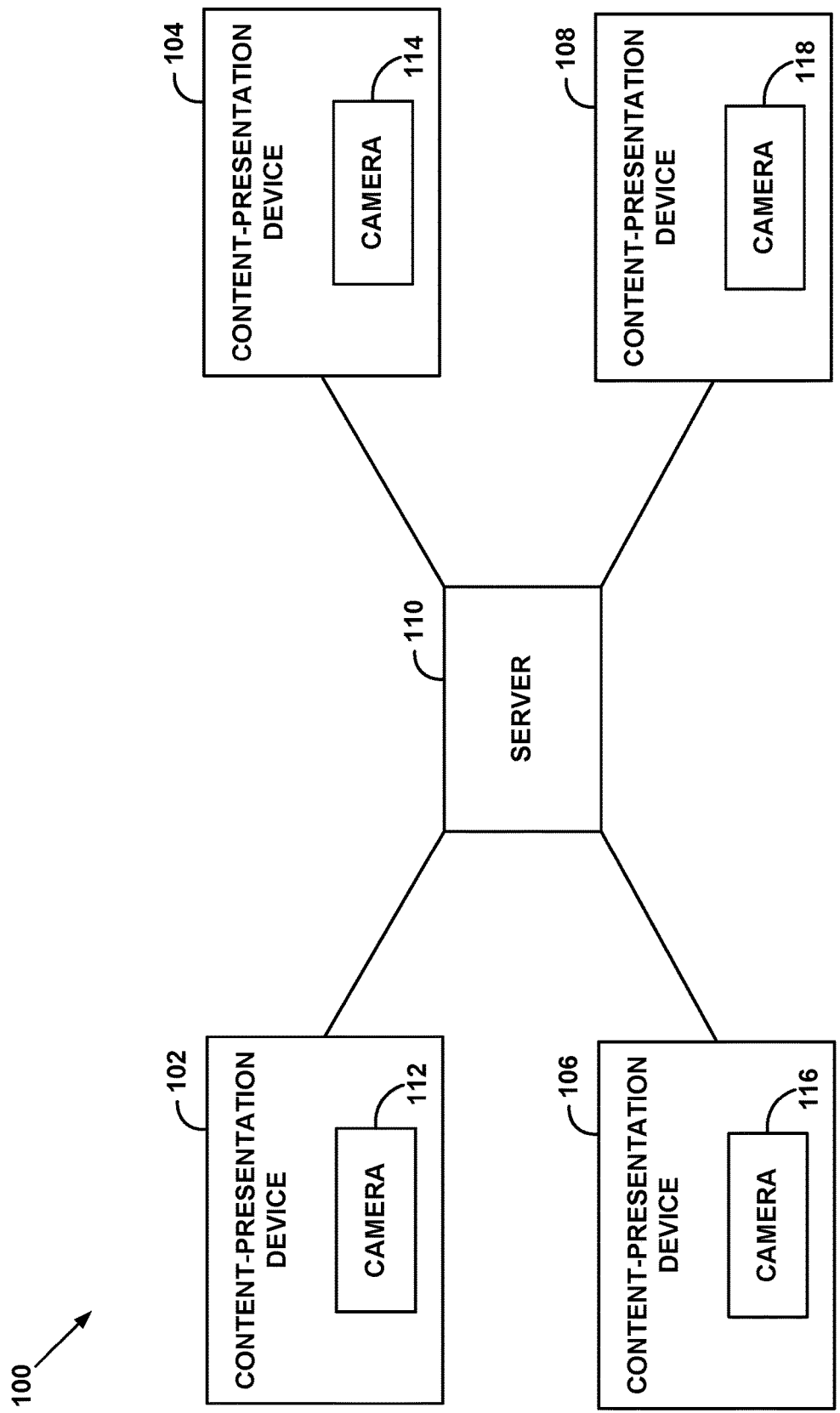
FIG. 1 is a simplified block diagram of an example communication system in which various described principles can be implemented.

FIG. 1 is a simplified block diagram of an example communication system 100. As shown, the communication system 100 includes four content-presentation devices 102, 104, 106, 108 and a server 110. Further, each content-presentation device can include, or otherwise be communicatively coupled to, a respective camera, represented by cameras 112, 114, 116, 118. Four content-presentation devices are shown by way of example. In other examples, more or less content-presentation devices can be present.

Any one of the content-presentation devices 102, 104, 106, 108 can be or include a mobile phone, laptop computer, desktop computer, tablet computer, video game console, Internet of Things (IoT) display device, set-top box, television set, television set with integrated set-top box, head-mountable device (e.g., a virtual reality headset or an augmented reality headset), or other type of computing device configured to present (e.g., display) content.

Any one of the cameras 112, 114, 116, 118 can take the form of a monocular camera, high-resolution infrared (IR) camera, or other type of camera. In some examples, any such camera can be a camera mounted on or near its respective content-presentation device (e.g., mounted on top of a television set), a camera integrated into its respective content-presentation device, or a camera that is integrated into a smartphone, among other possibilities. Further, in some examples, any such camera can include one or more microphones and/or one or more motion sensors (e.g., gyroscope or accelerometer). Each content-presentation device can be configured to receive and process image data received from its respective camera, and the server 110 can be configured to receive and process the same image data received from the content-presentation devices 102, 104, 106, 108.

The communication system 100 can also include one or more connection mechanisms that connect various components within the communication system 100. For example, the communication system 100 can include the connection mechanisms represented by lines connecting components of the communication system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The communication system 100 and/or components thereof can take the form of a computing system, an example of which is described below with respect to FIG. 2.

In some cases, the communication system 100 can include multiple instances of at least some of the described components, such as multiple instances of the server 110.

In the context of the present disclosure, the communication system 100 is a system in which a shared content viewing session can be implemented. As indicated above, a shared content viewing session is a communication session in which multiple users are receiving and viewing respective instances of the same media content in a synchronized manner. Colloquially, such sessions are sometimes referred to as "watch parties." To facilitate this, the server 110 can host the shared content viewing session and provide the respective instances of the same media content in the synchronized manner to the content-presentation devices 102, 104, 106, 108. As an example, the server 110 can be a media server run by a particular content creator or distributor and each user can access the media content via that creator's or distributor's software application installed on their respective content-presentation device.

In some cases, using a software application running on their respective content-presentation device, a given user can create a shared content viewing session or join a scheduled or ongoing shared content viewing session. For creating a shared content viewing session, the software application can provide the option to host a private shared content viewing session in which the session is only available to other users that the user specifically invites (e.g., transmits an invitation via the server for that user to join the shared content viewing session) or is friends with. Another option can be to host a public shared content viewing session in which the session is open to other users beyond those that the user specifically invites or is friends with. In any event, when creating a shared content viewing session, the user can choose to begin the shared content viewing session immediately or select a specific time for the shared content viewing session to start. Selection of the specific time might also automatically set an alarm in the form of a pop-up notification, sound, etc., to remind the user and any other invited user when the shared content viewing session is starting or about to start (e.g., five minutes from the start time).

In other some cases, using the software application running on their respective content-presentation device, a given user can select a particular piece of media content to watch (e.g., a movie) and look up to see whether there are any scheduled or ongoing public or private shared content viewing sessions available to join.

In further cases, a shared content viewing session can take the form of a peer-to-peer (P2P) session between two or more content-presentation devices in which multiple users are viewing respective instances of the same media content, hosted by one of the content-presentation devices, in a synchronized manner.

B. Computing System

Figure 2:
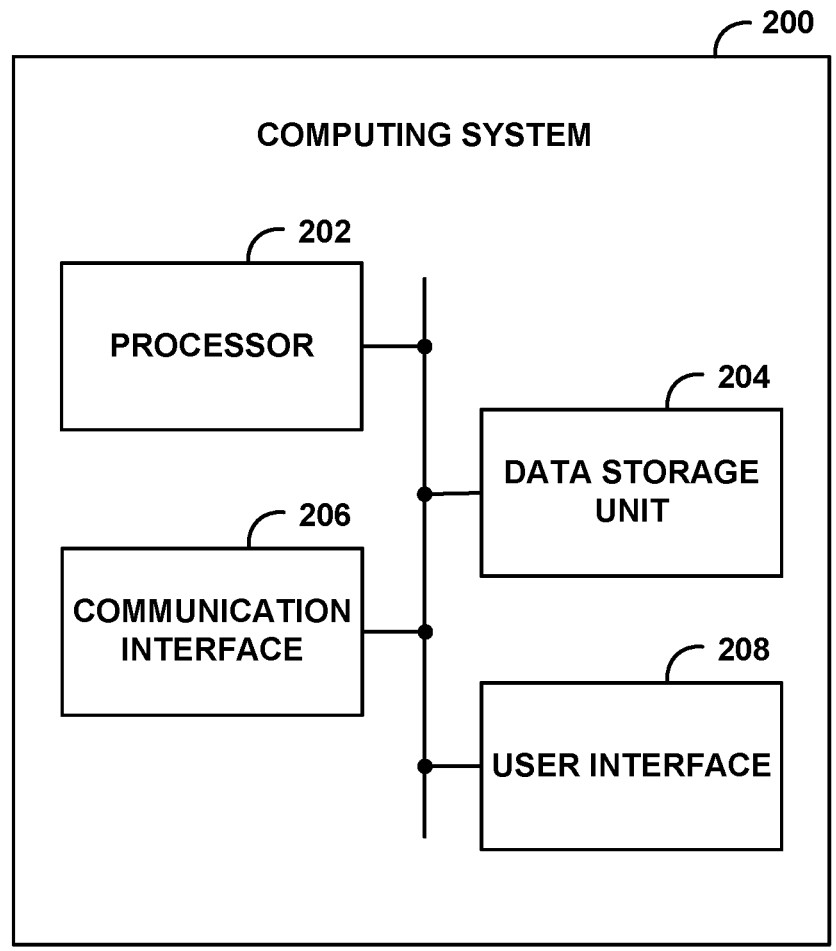
FIG. 2 is a simplified block diagram of an example computing system in which various described principles can be implemented.

FIG. 2 is a simplified block diagram of an example computing system 200. The computing system 200 can be configured to perform and/or can perform various operations, such as the operations described in this disclosure. The computing system 200 can include various components, such as a processor 202, a data storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data storage unit 204 as described below.

The data storage unit 204 can be or include one or more volatile, non-volatile, removable, and/or non-removable storage components, such as magnetic, optical, and/or flash storage, and/or can be integrated in whole or in part with the processor 202. Further, the data storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, such as a partially or fully cloud-based arrangement, for instance.

As noted above, the video system 100 and/or components of the video system 100 can take the form of a computing system, such as the computing system 200. In some cases, some or all of these entities can take the form of a more specific type of computing system, such as a desktop or workstation computer, a laptop, a tablet, a mobile phone, a television, a set-top box, and/or a streaming media device, among numerous other possibilities.

III. Example Operations

The communication system 100, the computing system 200, and/or components of either can be configured to perform and/or can perform various operations. Various example operations that the computing system 200 can perform, and related features, will now be described with reference to select figures.

As indicated above, multiple users can be participating in a shared content viewing session. During the shared content viewing session, the computing system 200 can detect that each of the multiple users respectively exhibits a threshold extent of physical reaction around the same time.

To detect when a given user has exhibited a threshold extent of physical reaction, the computing system 200 can receive visual data of the user captured by a camera (i.e., the camera coupled to that user's content-presentation device). The visual data can take the form of a still image or multiple frames of video. In some cases, the visual data recorded by the camera can be temporarily stored in memory accessible to the camera. For example, from a given reference timepoint, the camera can store five seconds worth of recorded footage and then replace that footage with the next five seconds worth of footage once that next five seconds worth of footage has been recorded. In other cases, larger amounts of visual data can be recorded and stored by the camera. For example, when a user is watching a two-hour movie in a shared content viewing session, recording can begin once the movie starts, can continue (or be paused) if the movie is paused), and can last until the movie ends, after which the recorded visual data can be stored. Other examples are possible as well.

Using the visual data, the computing system 200 can detect a set of physical features in the visual data. Physical features can include facial features such as lips, teeth, tongue, jaw, chin, cheek, forehead, eye, eyebrow, eyelid, nose, nostril, temple, and neck. Additionally or alternatively, physical features can include other body features such as arms, hands, fingers, shoulders, hips, and legs.

As such, the computing system 200 can detect the location of the set of physical features in a given image. For example, the computing system 200 can perform facial recognition on the image, which can involve any one or more of a variety of facial recognition techniques, including feature analysis and neural networks. For instance, the facial recognition can involve comparing the image to at least one reference image of the user, such as one or more images of the user captured and stored before the shared content viewing session was initiated. An output of the facial recognition can indicate whether a match between the image and the reference image(s) is detected. Similar recognition techniques can be performed relative to non-facial physical features as well.

Based on the detected set of physical features, the computing system 200 can determine an extent of physical reaction exhibited by the user using a physical reaction model. The physical reaction model can be stored in local memory of the computing system 200 (e.g., data-storage unit 204) or in a remote database.

By way of example, the physical reaction model can be configured to input at least one image, including the detected set of physical features, and output data indicating a physical reaction that is closest in similarity to that being exhibited by the user according to the detected set of physical features. To accomplish this, for example, the physical reaction model can include a classifier that is configured to map each of a plurality of physical reactions to a corresponding set of physical features. At some point, the computing system 200 can receive one or more pre-captured images or videos of the user, and the classifier can be trained using one or more pre-captured images or videos of the user as training data. In some cases, the physical reaction model can be or include a deep learning-based model that uses convolutional neural networks (CNN), transformer models, and/or deep neural networks (DNNs) trained using the one or more pre-captured images or videos. Each such neural network can convert a set of physical features into data indicating a corresponding physical reaction. Further, in some cases, pre-captured images or videos or other users can be used for reference as training data, additionally or alternatively to pre-captured images or videos of the user themselves.

In some cases, the computing system 200 can track the location of the set of physical features across a series of video frames. In addition, the computing system 200 can detect changes in the location of such features across two or more frames, and thus detect changes in the user's facial expression (e.g., the user raising their eyebrows and opening their mouth) and/or changes in the user's body language expression (e.g., the user moving from leaning back to sitting forward, or the user throwing their hands into the air). To facilitate this, the computing system 200 can perform local frame processing. For example, the computing system 200 can estimate a pose of the user's physical features in each of multiple different frames using a machine learning model, such as the same physical feature model described above or a different machine model. In some instances, that machine learning model can detect and track a set of physical features, which are treated as landmarks, over the course of a sequence of frames of the video. That is, the machine learning model can use image analysis to detect and identify the position of the user's facial and/or body features in a frame using the landmarks, and the relative position of the landmarks can change. The machine learning model can take any of a variety of forms depending on the desired implementation. One example of a machine learning model is BlazePose developed by Google AI™, which outputs pose information in the form of the pixel positions of 33 skeletal landmarks. Other examples include MoveNet and PoseNet provided by TensorFlow.

In view of the above, the act of detecting that the user has exhibited a threshold extent of physical reaction can take the form of detecting that the visual data, including the detected set of physical features, has a threshold extent of similarity to a reference image in which a corresponding physical reaction is depicted (e.g., each of the physical features of the set is within a threshold distance from an expected location of that feature the reference image). Additionally or alternatively, the act of detecting that the user has exhibited a threshold extent of physical reaction can take the form of detecting that the location of the detected set of physical features have changed at least a threshold extent (e.g., distance) across two or more frames of video of the user. Depending on which physical features have changed locations, this can result in detection of a change in body language expression and/or a change in facial expression. Other examples are possible as well.

In some implementations, the act of detecting that the user has exhibited a threshold extent of physical reaction can take other forms, such as by receiving an indication of user input on a remote control device, smartphone, or other input device, corresponding to a particular physical reaction. For example, when a user is happy while watching the media content during the shared content viewing session, the user can select a button displayed by their content-presentation device via a software application associated with the shared content viewing session, where the selected button corresponds to a happy reaction, whereas other buttons can correspond to other physical reactions and can be selected in other situations.

To determine that each of the multiple users respectively exhibits a threshold extent of physical reaction around the same time, the computing system 200 can determine that each of the multiple users respectively exhibits a threshold extent of physical reaction within a given time period range. For example, the given time period range can be between 0.5 seconds and 3.0 seconds. In practice, all of the users might not exhibit a physical reaction at exactly the same time, and so a time period range can be used to take into account physical reactions that occur within around the same time, but not exactly the same time.

In response to detecting that each of the multiple users respectively exhibits the threshold extent of physical reaction around the same time, the computing system 200 can, for each of the multiple users, generate and/or store respective visual content representing that user's physical reaction.

For example, the computing system 200 can select an image captured by the camera of that user and store that image in memory. In particular, the selected image can be an image that depicts the user exhibiting the threshold extent of physical reaction, such as an image that was analyzed in order to detect the physical reaction as described above. In some cases, the respective visual content can be a series of images, such as a short video (e.g., 0.25 seconds) or GIF of the user exhibiting the physical reaction that was detected.

As another example, the computing system 200 can generate and/or store respective visual content of an avatar generated for that user. In some cases, this can involve generating a synthetic image or synthetic video of an avatar of the user or selecting a predetermined synthetic image or synthetic video of the avatar, particularly where the avatar is depicted as exhibiting the physical reaction that was detected. For instance, if the computing system 200 detects, using the physical reaction model, that a given user was sad while watching the media content, the computing system 200 can select a predetermined synthetic video of the user's avatar crying.

In other cases, generating and/or storing respective visual content of the user's avatar can involve selecting a generating an emoji or selecting a preexisting emoji that is exhibiting the physical reaction that was detected.

Having generated and/or stored respective visual content for each of the multiple users, the computing system 200 can generate a visual content composition that includes at least the generated and/or stored visual content for each of the multiple users and output the generated visual content composition for presentation.

For example, the visual content composition can take the form of an image that includes respective images (e.g., snapshots) or videos of each other user exhibiting a respective detected physical reaction.

In some implementations, the generated visual content composition can also include a portion of the media content that corresponds to a time point at which the users' physical reactions occurred or a time range during which the users' physical reactions occurred. For example, the visual data analyzed by the computing system 200 can be timestamped. Those timestamps can be correlated with the current playback timestamp of the media content. Thus, the computing system 200 can determine the playback timestamp of the media content or a playback time range at/during which the users' physical reactions occurred. The portion of the media content that is included in the generated visual content composition can include a still frame of the media content or a video clip from the media content (e.g., a video clip having a predefined duration and beginning, ending, or centered on the determined playback timestamp at which the users' physical reactions occurred).

Figure 3:
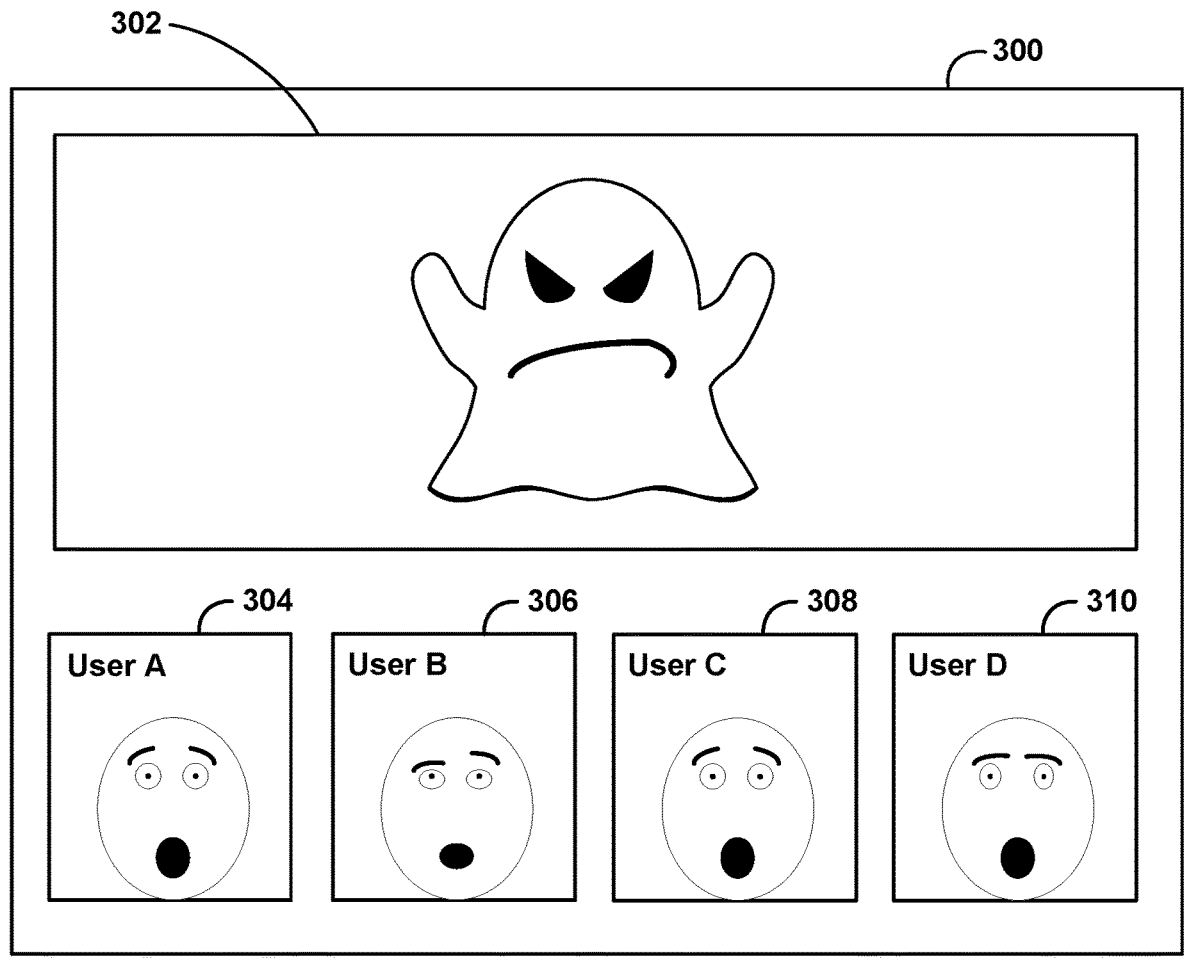
FIG. 3 is a depiction of an example visual content composition.

FIG. 3 is a depiction of an example visual content composition 300 in line with the aforementioned example. Consider, for instance, a scenario in which User A, User B, User C, and User D are using content-presentation devices 102, 104, 106, and 108 of FIG. 1, respectively, to watch a movie in a shared content viewing session. During the session, there is a moment in the movie in which a scary ghost appears, which causes each of the users to react in surprise and/or fright. As shown in FIG. 3, the visual content composition 300 can include a frame 302 from the movie, as well as respective images 304, 306, 308, and 310 of the users exhibiting surprise and/or fright.

In some cases, the act of outputting the generated visual content composition for presentation can involve transmitting the generated visual content composition to one, some, or all of multiple content-presentation devices respectively associated with the multiple users (e.g., content-presentation devices 102, 104, 106, 108 of FIG. 1). For example, the visual content composition 300 of FIG. 3 can be displayed in at least a portion of the respective screens of the television sets that the four users are using to watch the movie.

In some implementations, the computing system 200 can be configured to include, in the visual content composition, respective visual content for all of the multiple users regardless of whether there is any similarity between their respective detected physical reactions and whether users physically react at all. For example, a visual content composition might include snapshots of three of four users laughing and a snapshot of the fourth user not laughing.

In some implementations, the computing system 200 can be configured to include, in the visual content composition, respective visual content for a subset of the multiple users instead of for all of the multiple users. For example, the computing system 200 can be configured to include, in the visual content composition, respective visual content for only users that exhibit a threshold extent of physical reaction. For instance, a visual content composition might include snapshots of two of four users laughing and a snapshots of a third user crying, but no visual content for a fourth user if the fourth user does not react or change their previous facial expression and/or body language. As another example, the computing system 200 can be configured to include, in the visual content composition, respective visual content for only users that exhibit the same physical reaction. For instance, if two of four users laugh, another user cries, and the last user does not react, the visual content composition might include snapshots of only the two users that are laughing.

In some cases, the computing system 200 can receive or otherwise access metadata stored with, received with, or encoded in the media content. The metadata can be included in the media content by the content creator or another entity. The metadata can specify a time point in the media content at which a particular event occurs, as well as an expected physical reaction associated with the particular event. For example, the particular event can be a joke told by a character in a movie at a time point of thirty minutes (i.e., 00:30:00) into the movie, and the expected physical reaction can be laughter. The inclusion of this time point in the metadata can cause the computing system 200 to perform at least some of the disclosed operations relative to that time point. For instance, the computing system 200 can obtain and analyze visual data received from each of the content-presentation devices within a one-second interval of the 00:30:00 minute mark to detect physical reactions of the multiple users. And in situations where the metadata specifies an expected physical reaction, the computing system 200 can be configured to include, in the visual content composition, respective visual content for a given user only if that user exhibits a threshold extent of a physical reaction that matches the expected physical reaction.

In some cases, the computing system 200 can use a determined extent of physical reaction exhibited by one or more of the multiple users and/or characteristics of those reactions as a basis to recommend content to one or more of the multiple users. For instance, in one aspect, responsive to the computing system 200 detecting that each of the multiple users respectively exhibits a threshold extent of physical reaction around the same time, the computing system 200 can determine a content recommendation and output it for presentation to the multiple users (or perhaps to some portion of the multiple users). In some instances, the computing system 200 can take into account the nature/type of the content or the specific moment that caused the physical reaction and/or characteristics of the physical reaction, in determining an appropriate content recommendation.

For example, continuing with the scary ghost moment example discussed above, in the event that each of the multiple users (or a threshold number of the multiple users) reacts to this moment in surprise and/or fright, this could be an indication that the users are engaged in the movie and enjoy such types of content. As such, the computing system 200 can responsibly determine and output for presentation one or more content recommendations on that basis. In one implementation, the system can determine recommended content based on a determination that the recommended content is likely to elicit a similar reaction to the reaction at issue (which the computing system 200 can determine based on similarity of content description data for the two content items, for example). Such a content recommendation could then be output for presentation as part of or instead of the visual content composition as described above, for example.

Continuing again with the scary ghost moment example discussed above, in the event that each of the multiple users (or a threshold number of the multiple users) do not react in surprise and/or fright, this could be in indication that the users are not engaged and/or do not enjoy such types of content. As such, the computing system 200 can instead responsively output for presentation an alternative content recommendation (e.g., for a different type of content that the user may be more likely to enjoy). Notably, in determining and outputting for presentation content recommendations, the computing system 200 can also consider other input data, such as user preference data and/or user profile data for that user, which can help the content system 200 determine an appropriate content recommendation.

Figure 4:
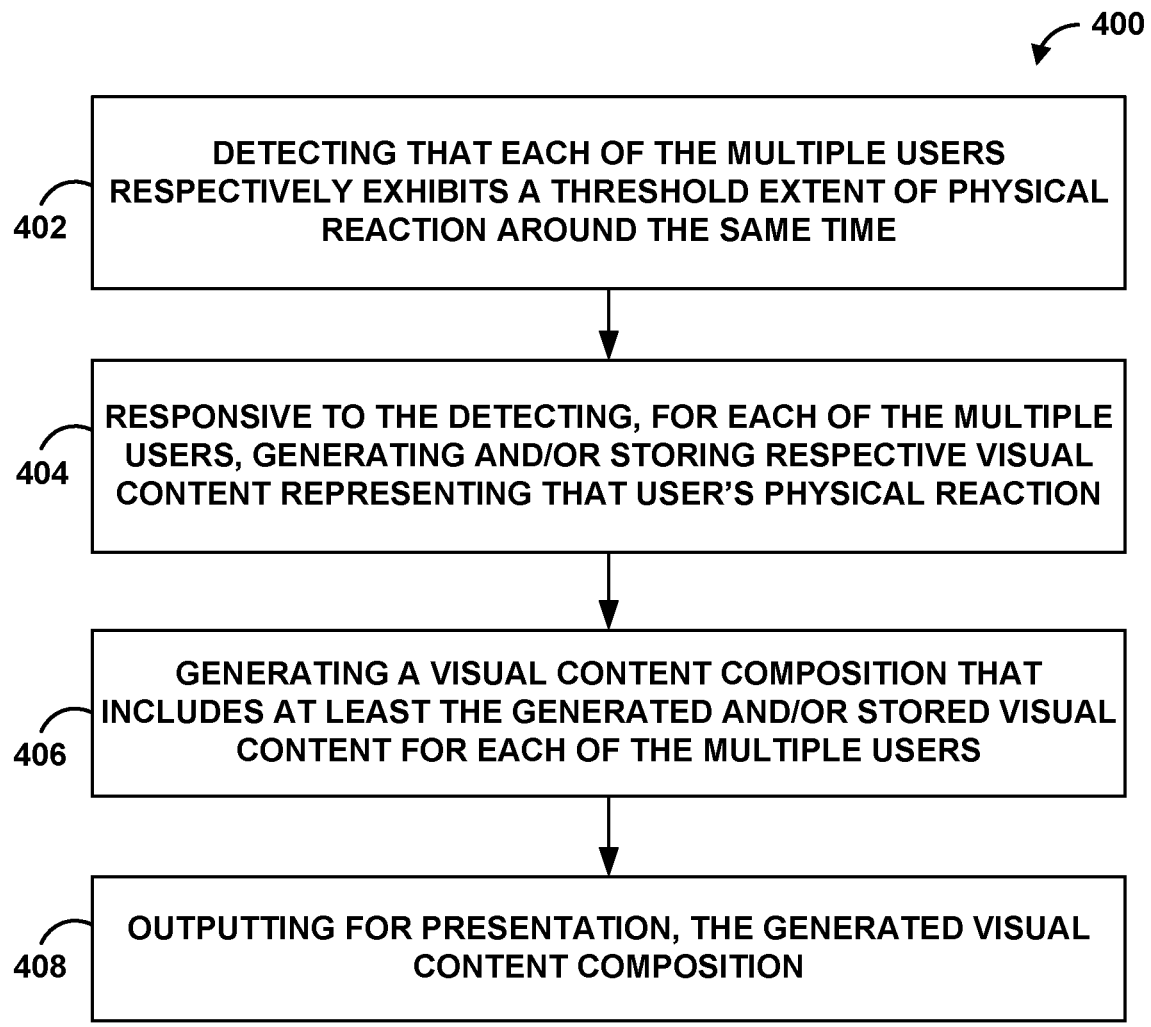
FIG. 4 is a flow chart of an example method.

FIG. 4 is a flow chart illustrating an example method 400 for use in connection with a shared content viewing session in which multiple users are receiving and viewing respective instances of the same media content in a synchronized manner. The method 400 can be carried out by a server, such as server 110, or more generally, by a computing system, such as the computing system 200. At block 402, the method 400 includes detecting that each of the multiple users respectively exhibits a threshold extent of physical reaction around the same time. At block 404, the method 400 includes responsive to the detecting, for each of the multiple users, generating and/or storing respective visual content representing that user's physical reaction. At block 406, the method 400 includes generating a visual content composition that includes at least the generated and/or stored visual content for each of the multiple users. At block 408 the method 400 includes outputting for presentation, the generated visual content composition.

Figure 5:
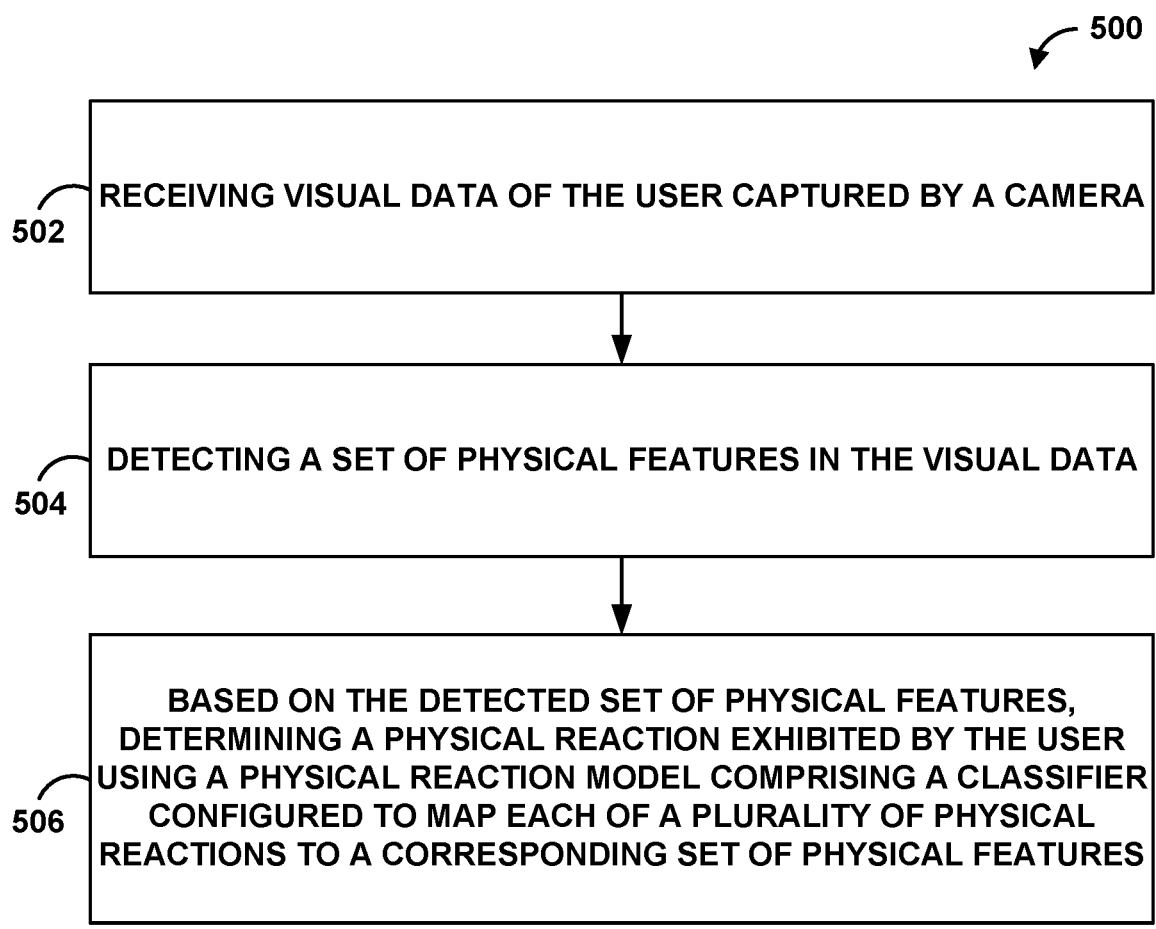
FIG. 5 is a flow chart of another example method.

FIG. 5 is a flow chart illustrating another example method 500, which is an example technique for detecting that each of the multiple users respectively exhibits a threshold extent of physical reaction around the same time. The method 500 can apply to each of the multiple. At block 502, the method 500 incudes receiving visual data of the user captured by a camera. At block 504, the method 500 includes detecting a set of physical features in the visual data. And at block 506, the method 500 includes based on the detected set of physical features, determining a physical reaction exhibited by the user using a physical reaction model comprising a classifier configured to map each of a plurality of physical reactions to a corresponding set of physical features.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use in connection with a shared content viewing session in which multiple users are receiving and viewing respective instances of media content in a synchronized manner, the method comprising:
   accessing metadata associated with the media content, wherein the metadata specifies (i) a time point in the media content at which a particular event occurs, and (ii) an expected type of physical reaction associated with the particular event;
   near the time point in the media content at which a particular event occurs, detecting that (i) each of the multiple users respectively exhibits a threshold extent of physical reaction around a same viewing time within the shared content viewing session, and (ii) the expected type of physical reaction matches a type of the physical reaction of the multiple users;
   responsive to the detecting, for each of the multiple users, generating and/or storing respective visual content representing that user's physical reaction;
   generating a visual content composition that includes at least the generated and/or stored visual content for each of the multiple users; and
   outputting for presentation, the generated visual content composition.

2. The method of claim 1, wherein exhibiting the threshold extent of physical reaction comprises exhibiting a threshold change in facial expression around the same time.

3. The method of claim 1, wherein exhibiting the threshold extent of physical reaction comprises exhibiting a threshold change in body language expression around the same time.

4. The method of claim 1, wherein around the same viewing time comprises within a given time period range.

5. The method of claim 4, wherein the given time period range is between 0.5 seconds and 3.0 seconds.

6. The method of claim 1, wherein detecting that each of the multiple users respectively exhibits a threshold extent of physical reaction around the same viewing time comprises:
   for each of the multiple users:
      receiving visual data of the user captured by a camera, detecting a set of physical features in the visual data, and
      based on the detected set of physical features, determining a physical reaction exhibited by the user using a physical reaction model comprising a classifier configured to map each of a plurality of physical reactions to a corresponding set of physical features.

7. The method of claim 1, wherein for each of the multiple users, generating and/or storing respective visual content representing that user's physical reaction comprises storing respective visual content captured by a camera of that user.

8. The method of claim 1, wherein for each of the multiple users, generating and/or storing respective visual content representing that user's physical reaction comprises generating and/or storing respective visual content of an avatar generated for that user.

9. The method of claim 1, wherein the generated visual content composition further includes a portion of the media content that corresponds to a time point or range at or during which the users' physical reactions occurred.

10. The method of claim 1, wherein outputting for presentation, the generated visual content composition comprises, transmitting the generated visual content composition to multiple content-presentation devices, respectively associated with the multiple users.

11. The method of claim 10, wherein at least one of the multiple content-presentation devices is a television.

12. A computing system configured for performing a set of acts in connection a shared content viewing session in which multiple users are receiving and viewing respective instances of media content in a synchronized manner, the set of acts comprising:
   accessing metadata associated with the media content, wherein the metadata specifies (i) a time point in the media content at which a particular event occurs, and (ii) an expected type of physical reaction associated with the particular event;
   near the time point in the media content at which a particular event occurs, detecting that (i) each of the multiple users respectively exhibits a threshold extent of physical reaction around a same viewing time within the shared content viewing session, and (ii) the expected type of physical reaction matches a type of the physical reaction of the multiple users;
   responsive to the detecting, for each of the multiple users, generating and/or storing respective visual content representing that user's physical reaction;
   generating a visual content composition that includes at least the generated and/or stored visual content for each of the multiple users; and
   outputting for presentation, the generated visual content composition.

13. The computing system of claim 12, wherein exhibiting the threshold extent of physical reaction comprises exhibiting a threshold change in facial expression around the same time.

14. The computing system of claim 12, wherein exhibiting the threshold extent of physical reaction comprises exhibiting a threshold change in body language expression around the same time.

15. The computing system of claim 12, wherein around the same viewing time comprises within a given time period range.

16. The computing system of claim 15, wherein the given time period range is between 0.5 seconds and 3.0 seconds.

17. The computing system of claim 12, wherein detecting that each of the multiple users respectively exhibits a threshold extent of physical reaction around the same viewing time comprises:
   for each of the multiple users:
      receiving visual data of the user captured by a camera, detecting a set of physical features in the visual data, and
      based on the detected set of physical features, determining a physical reaction exhibited by the user using a physical reaction model comprising a classifier configured to map each of a plurality of physical reactions to a corresponding set of physical features.

18. The computing system of claim 12, wherein for each of the multiple users, generating and/or storing respective visual content representing that user's physical reaction comprises storing respective visual content captured by a camera of that user.

19. The computing system of claim 12, wherein for each of the multiple users, generating and/or storing respective visual content representing that user's physical reaction comprises generating and/or storing respective visual content of an avatar generated for that user.

20. A non-transitory computer-readable medium having stored thereon program instructions that upon execution by a computing system, cause performance of a set of acts in connection with a shared content viewing session in which multiple users are receiving and viewing respective instances of media content in a synchronized manner, the set of acts comprising:

accessing metadata associated with the media content, wherein the metadata specifies (i) a time point in the media content at which a particular event occurs, and (ii) an expected type of physical reaction associated with the particular event;

near the time point in the media content at which a particular event occurs, detecting that (i) each of the multiple users respectively exhibits a threshold extent of physical reaction around a same viewing time within the shared content viewing session, and (ii) the expected type of physical reaction matches a type of the physical reaction of the multiple users;

responsive to the detecting, for each of the multiple users, generating and/or storing respective visual content representing that user's physical reaction;

generating a visual content composition that includes at least the generated and/or stored visual content for each of the multiple users; and outputting for presentation, the generated visual content composition.

\* \* \* \* \*